Patented Aug. 25, 1936

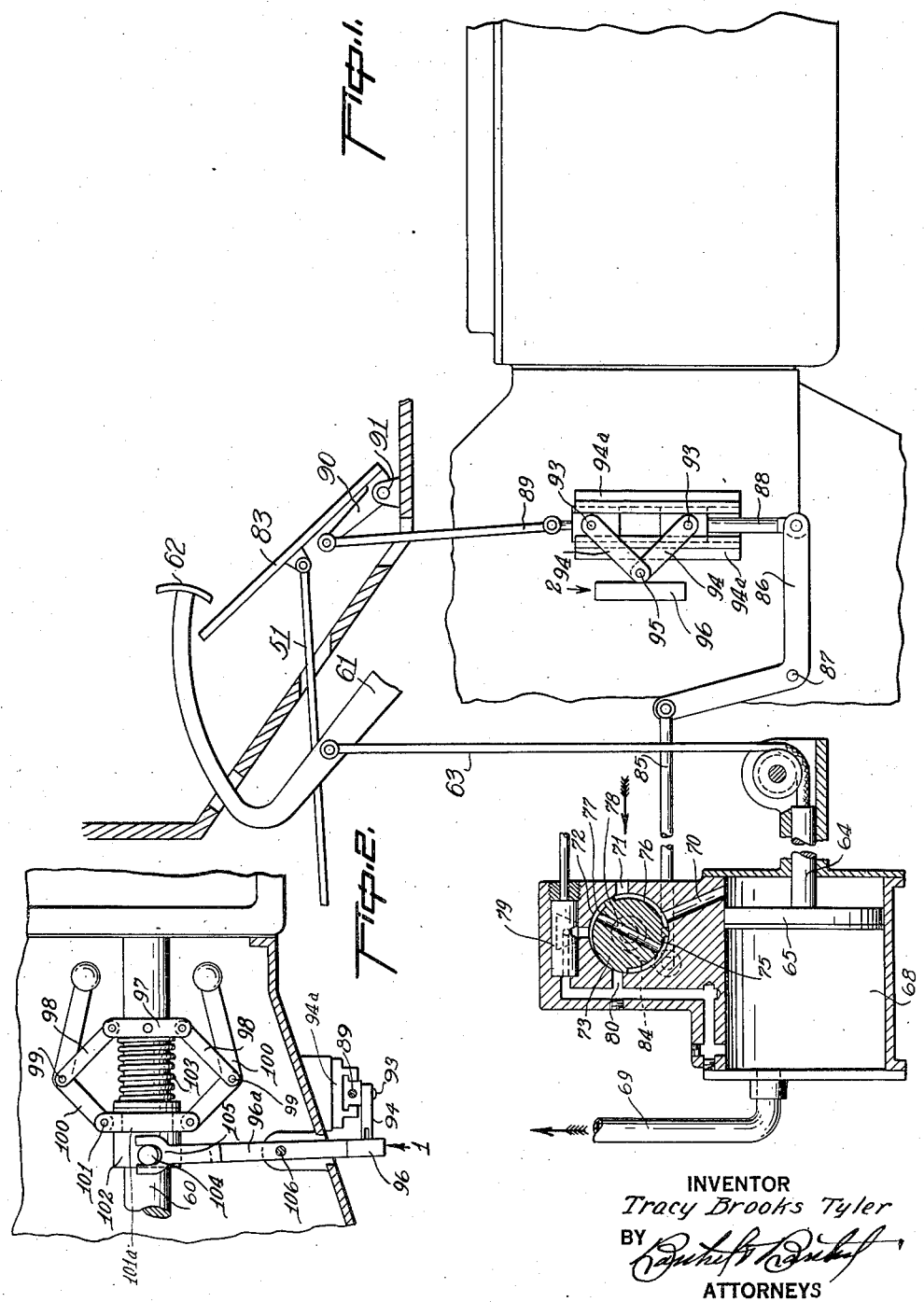

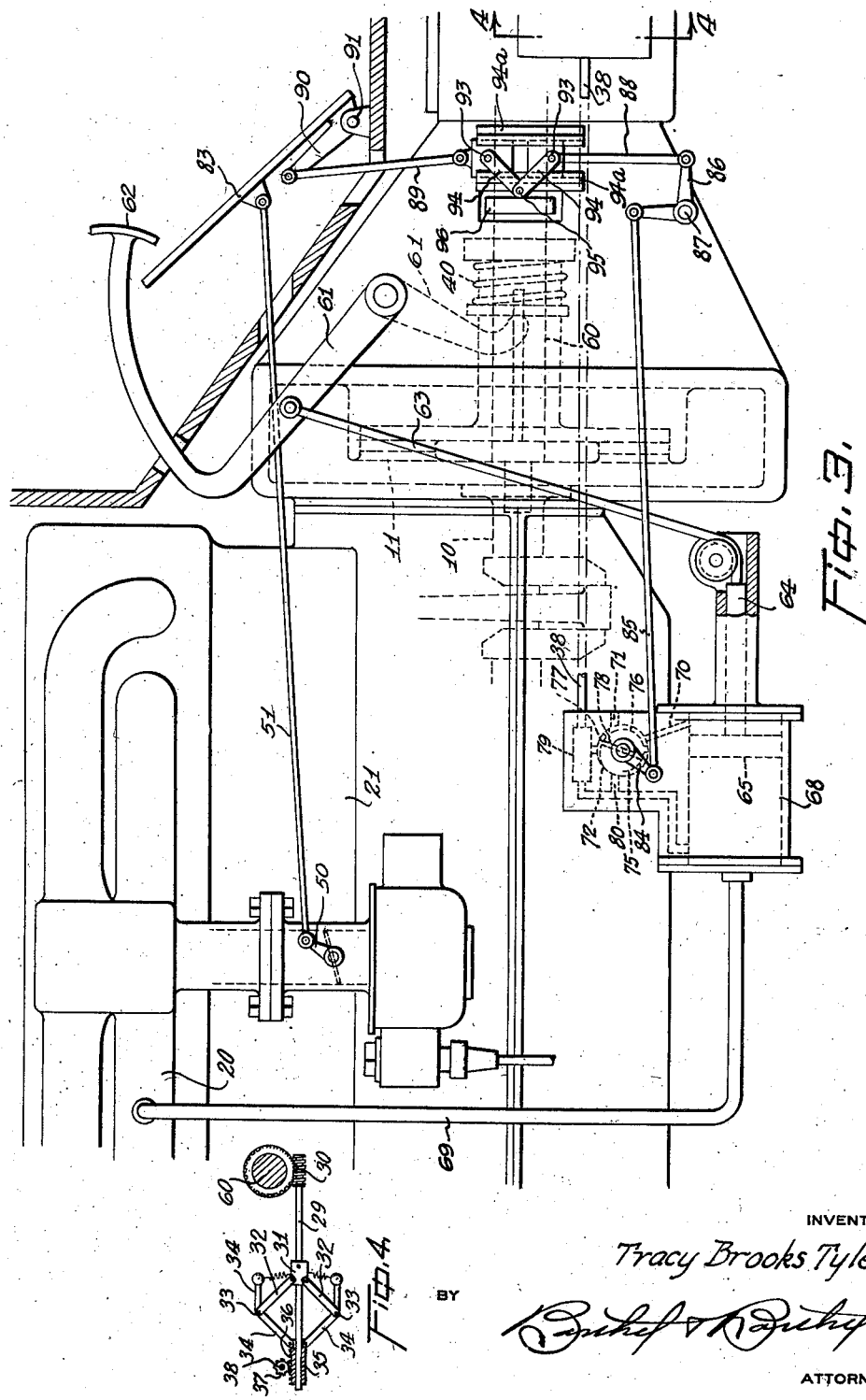

2,052,428

UNITED STATES PATENT OFFICE 2,052,428

CLUTCH CONTROL DEVICE

Tracy Brooks Tyler, Detroit, Mich., assignor to The Monopower Corporation, Detroit, Mich., a corporation of Michigan Application May 19, 1932, Serial No. 612,195
Renewed January 23, 1936

14 Claims. (Cl. 192—.01)

This invention relates to control devices for clutches used in conjunction with engines, preferably automobile engines, and more particularly relates to means for causing the engine to be speeded up so that the speed of its crank shaft will equal or slightly surpass the speed of the transmission shaft, before the master clutch of the vehicle is caused to become engaged.

In this application, I provide means operating on a clutch actuator and controlled in part by the speed of the vehicle, whereby the operator must automatically cause the engine to be speeded up to a desired degree before he can cause the clutch actuator to move for clutch engagement.

The invention of this application is of particular importance in connection with clutch actuators of the automatic type, controlled by that foot of the operator which controls the engine throttle. The means of this application is so constructed that the operator's foot pressure will open the throttle and cause engine acceleration before his foot pressure will succeed in causing clutch engagement movement of the actuator parts.

Objects of the invention will become readily apparent upon reference to the following detailed description and the appended drawings, in which—

Figure 1 is a longitudinal, elevational, fragmentary view of an embodiment of the invention;

Fig. 2 is a fragmentary top plan view of parts associated with those of Figure 1, Fig. 3 is a side elevation illustrating the assembly and arrangement of the present device relative to the engine parts of an automobile, and Fig. 4 is a view taken along the line 4—4 of Fig. 3.

The arrows 1 and 2 of Figures 2 and 1, respectively, show the directions in which the views of Figures 1 and 2 were taken.

Referring to the drawings, it will be seen that there is provided a transmission shaft 60 which is to be clutched to an engine shaft 10 by a clutch 11 actuable by the clutch operating lever 61. The clutch lever 61 has a pedal extension 62, whereby the clutch may be actuated pedally, and without synchronization. It is also connected by a flexible cable 63 and a piston rod 64 to the piston 65 of a clutch actuator, which cooperates with other parts to effect synchronized movement of the clutch parts.

The actuator which is like the one disclosed in my copending application, Serial No. 614,946, filed June 2, 1932, includes a cylinder 68 connected to a suction medium, such as the engine intake manifold 20 of an internal combustion engine 21 through conduit 69 and to a pressure medium (atmosphere) through ports 70 and 71, these opening to a chamber 72 in which a rotary valve 73 is journalled. This valve is provided with reliefs 75, 76 and 77 as shown and a transverse bore 78 connecting reliefs 75 and 77.

The valve in one position permits pressure medium to flow into the cylinder, back of piston 65, through port 71, relief 76, and port 70, to cause clutch disengagement movement of the lever 61. In the other position the valve permits the pressure medium to bleed out of the space in back of piston 65 through port 70, relief 75, bore 78, relief 77, variable bleeder valve 79, and passage 80 and permit the clutch engagement springs 40, to cause clutch engagement.

The variable bleeder valve 79 is a rotary type valve such as shown in my co-pending application Serial No. 614,944, filed June 2, 1932, and the means for rotating the same includes a shaft 29 that is geared as at 30 to the driven shaft 60 to rotate therewith. Fixed on the shaft 30 is a collar 31 to which arms 32 are pivoted, the arms 32 being pivotally connected at 33 to weighted arms 34 that are pivotally connected to a slidable collar 35. On the collar 35 is formed a rack 36 which meshes with a pinion 37 on a rod 38 that is connected to the rotary bleeder valve 79. It is obvious that rotation of the shaft 29 sets up centrifugal force to move the arms 34 outwardly and thus move the rack 36 to rotate the rod 38 and valve 79.

The valve 73 is rotatable by a pedal 83, which may be nothing more than a valve manipulator pedal or which may be also a throttle pedal connected to the carburetor valve lever 50 by a rod 51, through an external crank 84, connected to a link 85, a bell crank 86 pivoted at 87, a variable length rod 88—89, and a lever 90, pivoted at 91, and secured to the pedal 83, which when rotated assumes its clutch disengagement position, or the clutch engagement position of Figure 1. To the adjacent ends of rod portions 88—89 are pivoted at 93, toggle links 94, whose ends are slidable in a guide 94a and which are pivoted together at 95 and whose relation, for affecting the length of rod 88—89, is controlled by the end 96 of a movable forked transverse control arm 96a, the position of the latter being controlled through a speed sensitive means by the speed of the transmission shaft 60.

Fixed to the shaft 60 is a collar 97 to which are pivoted links 98, these in turn being pivoted at 99 to weighted arms 100 pivotally secured at 101 to a rotatable collar 101a retained in an annular groove of a slidable sleeve 102. The latter is influenced by a spring 103 and is connected by pins 104 to the yoked end 105 of the control arm 96a, which is pivoted at 106 as shown in Fig. 2.

The operation of the device is as follows: When the vehicle is at rest, and the engine is running, and the clutch actuator is in operation, the engine suction will first cause the clutch to become disengaged. Further, since transmission shaft 60 is at rest, spring 103 will have moved the end 96 of control arm to its extreme right position, against pivot 95 of links 94, which links are then in their extreme open position. Rod 88—89 will have its greatest length at this time, and the least movement of pedal 83 will immediately cause movement of the valve 73 and the associated parts to clutch engagement position, without delay. The clutch engages immediately under these conditions, and the vehicle starts to move. As the speed of the vehicle increases, the weighted arms 108 of the speed sensitive means move outwardly and move end 96 of control arm towards the left, away from the pivot 95 of links 94.

After a while the operator releases pedal 83 to disengage the clutch and to permit the engine to idle, under low throttle condition, with the vehicle coasting. Under these conditions, pivot 95 will be at some distance from end 96 of arm 96a, the distance depending upon the speed of the vehicle. Then, when the operator desires to reengage the clutch, he depresses throttle pedal 83 again, which first causes the engine to speed up. Since the engine speed depends upon the position of the throttle pedal, and since the position assumed by the latter before it moves far enough to cause clutch engagement, depends upon the position of arm end 96, the throttle pedal must move to cause acceleration before it causes clutch engagement. This differential action of the pedal permits engine speed to be synchronized to the transmission shaft (or vehicle) speed, before reengagement of the master clutch. By providing such synchronization, lurching of the vehicle, that ordinarily occurs on clutch reengagement after the vehicle had been coasting for a few moments, is eliminated.

It will be observed that the differential action directly corresponds to the position of control arm end 96, and thus directly corresponds to the speed of the transmission shaft or vehicle. Since the latter is a variable, and since the speed of the engine, on full decelerated position of the pedal 83 is more or less constant within limits, the differential distance corresponds to the difference between the vehicle speed and the engine speed.

It will also be observed that the clutch actuator of Figure 1, while shown as provided with a means 79 for correlating the rate of clutch engagement movement of the parts to the engine vehicle speed, that is, means such as are shown in application Serial No. 614,944, filed June 2, 1932, the same may well be eliminated. When the means is provided however, the device will operate in two ways, (1) to postpone the start of clutch engagement movement of the parts until the speed of the engine shaft has been caused to equal or surpass that of the vehicle transmission shaft 60, and (a) to correlate the rate of clutch engagement movement of the parts to the speed of the vehicle.

Examples of the operation of the devices will now be given: (1) if the vehicle is coasting at let us say five miles per hour, the clutch parts will start to move for clutch engagement almost immediately, but once having started to move, will move fairly slowly. (2) If the vehicle is coasting at let us say twenty-five miles per hour, the clutch parts will not start to move for clutch engagement for some few moments, but once having started to move, will move very rapidly.

It will also be observed that the construction shown provides a throttle pedal control for clutch engagement. This being true whether pedal 83 is actually a throttle pedal or is so associated with a throttle pedal as to have a common movement therewith.

Further, it will be seen that the construction shown releases the actuator for clutch disengagement immediately upon a relieving of the foot pressure upon pedal 83, regardless of where the pedal happens to be, when the foot pressure thereon is relieved.

Now having described a preferred embodiment of the invention, reference will be had to the appended claims, which define and limit the invention, it being understood that the same is not to be limited to the details disclosed.

What I claim is:

1. In a machine wherein a clutch is used to connect a drive member and a driven member, and wherein the drive member has a speed control, the combination of sets of operating connections extending respectively to said clutch and to said speed control, means for initiating operating movement in said sets of connections in a manner tending to increase the drive member speed and tending to cause clutch engagement, and a lost-motion device in said clutch set of connections for deferring a complete clutch engagement movement of the clutch set of connections until said drive member has attained a proper clutching speed relative to that of said driven member.

2. In a machine wherein a clutch is used to connect a drive member and a driven member, and wherein the drive member has a speed control, the combination of sets of operating connections extending respectively to said clutch and to said speed control, means for initiating operating movement in said sets of connections in a manner tending to increase the drive member speed and tending to cause clutch engagement, and a lost-motion device in said clutch set of connections for deferring a complete clutch engagement movement of the clutch set of connections until said drive member has attained a proper clutching speed relative to that of said driven member, and means controlled by the speed of said driven member for defining the operative effect of said lost motion device.

3. In a machine wherein a clutch is used to connect a drive member and a driven member, and wherein the drive member has a speed control, the combination of sets of operating connections extending respectively to said clutch and to said speed control, means for initiating operating movement in said sets of connections in a manner tending to increase the drive member speed and tending to cause clutch engagement, and a lost-motion device in said clutch set of connections for deferring a complete clutch engagement movement of the clutch set of connections until said drive member has attained a proper clutching speed relative to that of said driven member, an adjustable member for defining the operative effect of said lost-motion device, and means connecting said adjustable member with said driven member for correlating the maximum limit of said lost-motion device with the speed of said driven member.

4. In a machine wherein a clutch is used to connect a drive member and a driven member, and wherein the drive member has a speed control, the combination of sets of operating connections extending respectively to said clutch and to said speed control, means for initiating operating movement in said sets of connections in a manner tending to increase the drive member speed and tending to cause clutch engagement, and a lost-motion device in said clutch set of connections for deferring a complete clutch engagement movement of the clutch set of connections until said drive member has attained a proper clutching speed relation to that of said driven member, and adjustable member for defining the operative effect of said lost-motion device, and a governor operable by said driven member and connected to said adjustable member for correlating the maximum limit of said lost-motion device with the speed of said driven member.

5. In a machine wherein a clutch is used to connect a drive member and a driven member and wherein the drive member has a speed control, the combination of sets of operating connections extending respectively to said clutch and to said speed control, means for initiating operating movement in said sets of connections in a manner tending to increase the drive member speed and tending to cause clutch engagement, a motion-absorbing toggle inserted in said clutch set of connections for absorbing initial movement in said clutch set of connections, a stop engageable with said toggle to limit the absorbing action thereof, and means connecting said stop to said driven member for correlating the maximum limit of movement of said toggle with the speed of said driven member.

6. In a machine wherein a clutch is used to connect a drive member and a driven member and wherein the drive member has a speed control, the combination of sets of operating connections extending respectively to said clutch and to said speed control, means for initiating operating movement in said sets of connections in a manner tending to increase the drive member speed and tending to cause clutch engagement, a motion-absorbing toggle inserted in said clutch set of connections for absorbing initial movement in said clutch set of connections, a stop engageable with said toggle to limit the absorbing action thereof, and responsive to the speed of said driven member for connecting said stop to said driven member for correlating maximum limit of movement of said toggle with the speed of said driven member.

7. In a machine wherein a clutch having an actuator is used to connect a drive member and a driven member, and wherein the drive member has a speed control, a control device for said actuator, a pedal lever, connections between said control device and said pedal and between said speed control and said pedal, one of said connections being of fixed length and the other being adjustable in length, and means operated by said driven member for varying the length of said adjustable member in accordance with speed of rotation of said member.

8. In a machine wherein a clutch having an actuator is used to connect a drive member and a driven member, and wherein the drive member has a speed control, a control device for said actuator, a pedal lever, connections between said control device and said pedal and between said speed control and said pedal, one of said connections being positive in its action and the other of said connections being variable in its action, and means for varying the action of said variable connection in accordance with the speed of said driven member.

9. In a machine wherein a clutch having an actuator is used to connect a drive member and a driven member, and wherein the drive member has a speed control, a control device for said actuator, a pedal lever, connections between said control device and said pedal and between said speed control and said pedal, one of said connections being positive in its action and the other of said connections being variable in its action, and means operated by said driven member and responsive to the speed thereof for varying the action of said variable connection.

10. In a machine wherein a clutch having an actuator is used to connect a drive member and a driven member, and wherein the drive member has a speed control, a control device for said actuator, a personally controlled pedal lever, a positive connection between said pedal lever and said speed control, a lost motion connection between said pedal lever and said control device, and means for varying the amount of lost motion in said last named connection.

11. In a machine wherein a clutch having an actuator is used to connect a drive member and a driven member, and wherein the drive member has a speed control, a control device for said actuator a personally controlled pedal lever, a positive connection between said pedal lever and said speed control, a lost motion connection between said pedal lever and said control device, and means responsive to the speed of said drive member for varying the amount of lost motion in said last named connection.

12. In a machine wherein a clutch having an actuator is used to connect a drive member and a driven member, and wherein the drive member has a speed control, a control device for said actuator, a personally controlled pedal lever, a positive connection between said pedal lever and said speed control, a lost motion connection between said pedal lever and said control device, and means actuated by said driven member and associated with said lost motion connection to govern the amount of lost motion therein and vary it in accordance with the speed of rotation of said driven member.

13. In a machine wherein a clutch having an actuator is used to connect a drive member to a driven member, and wherein the drive member has a speed control operated by a lever, a control device for said actuator, a motion absorbing connection between said lever and said control device, and speed responsive means for defining the motion absorbing action of said connection.

14. In a machine wherein a clutch is used to connect a drive member to a driven member, and wherein the drive member has a speed control operated by a lever, a clutch actuator, a motion absorbing connection between said lever and said clutch actuator, and speed responsive means for defining the motion absorbing action of said connection.

TRACY BROOKS TYLER.